(12) United States Patent
Wang et al.

(10) Patent No.: US 11,333,749 B2
(45) Date of Patent: May 17, 2022

(54) METHOD AND DEVICE FOR DETERMINING MOTION TRAJECTORY OF TARGET

(71) Applicant: BEIHANG UNIVERSITY, Beijing (CN)

(72) Inventors: Xiangrong Wang, Beijing (CN); Huaiyuan Liang, Beijing (CN); Pengcheng Wang, Beijing (CN); Xianbin Cao, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 354 days.

(21) Appl. No.: 16/576,755

(22) Filed: Sep. 19, 2019

(65) Prior Publication Data
US 2020/0341136 A1   Oct. 29, 2020

(30) Foreign Application Priority Data

Apr. 25, 2019   (CN) .......................... 201910338702.3

(51) Int. Cl.
*G01S 13/72* (2006.01)
*G01S 13/58* (2006.01)

(52) U.S. Cl.
CPC .......... *G01S 13/723* (2013.01); *G01S 13/584* (2013.01)

(58) Field of Classification Search
None
See application file for complete search history.

(56) References Cited

FOREIGN PATENT DOCUMENTS

| CN | 106405541 A | 2/2017 |
|---|---|---|
| CN | 106597411 A | 4/2017 |
| CN | 106842166 A | 6/2017 |
| CN | 107167784 A | 9/2017 |
| CN | 108614267 A | 10/2018 |
| CN | 109298412 A | 2/2019 |
| CN | 109324317 A | 2/2019 |

OTHER PUBLICATIONS

CN108614267A translation (Year: 2018).*
CN109298412A translation (Year: 2019).*
(Continued)

*Primary Examiner* — Whitney Moore
(74) *Attorney, Agent, or Firm* — J.C. Patents

(57) ABSTRACT

Provided are a method and device for determining a motion trajectory of a target. The method includes: acquiring a transmitted signal, a first echo signal, and a second echo signal of a frequency modulated continuous wave radar; performing a coherent operation on the transmitted signal and the first echo signal, to determine a beat signal therebetween; performing a two-dimensional fast Fourier transform on the beat signal to determine an initial position of the target; performing a short-time Fourier transform on the beat signal to determine a radial velocity of the target; calculating a difference frequency signal between the first and second echo signals; determining a tangential velocity of the target according to the difference frequency signal; inputting the initial position, the radial velocity, and the tangential velocity to a Kalman filter, and receiving a motion trajectory of the target output by the Kalman filter.

10 Claims, 9 Drawing Sheets

(56) References Cited

OTHER PUBLICATIONS

CN106597411A translation (Year: 2017).*
Paper1: "Detection and Tracking of UAVs using Interferometric Radar", 2019 International Radar Conference (RADAR2019).
Paper2: "Simultaneous Tracking of Multiple Targets using Interferometric FMCW Radar", 978-1-7281-2345-5/19/$31.00 © 2019 IEEE.
The first Office Action of CN application No. 201910338702.3.

* cited by examiner

METHOD AND DEVICE FOR DETERMINING MOTION TRAJECTORY OF TARGET

CROSS-REFERENCE TO RELATED APPLICATIONS

This application claims priority to Chinese Patent Application No. 201910338702.3, filed on Apr. 25, 2019, which is incorporated herein by reference in its entirety.

TECHNICAL FIELD

The present disclosure relates to the field of drones, and in particular to a method and a device for determining a motion trajectory of a target.

BACKGROUND

Nowadays, with the vigorous development of smart transportation, unmanned logistics and other industries, drones and other related equipment are becoming more and more popular in people's life. However, public concerns about the safety hazards of drones due to accidental operation or improper use are increasing. Therefore, real-time monitoring and trajectory tracking of the drones in a target area is necessary.

In an existing technology, the target is usually monitored and tracked in the target area using conventional radar. However, since the small drone has small radar cross section, low altitude and low velocity, it is difficult to detect and track such target. In addition, some drones have complex and variable motion paths, which are difficult to describe with feasible mathematical models, increasing the difficulty of tracking. Therefore, the traditional method of determining the motion trajectory of the target using conventional radar may not be able to monitor the motion trajectory of the drone.

SUMMARY

The present disclosure provides a method and a device for determining a motion trajectory of a target, so as to solve the problem that the motion trajectory of a drone cannot be effectively monitored with a conventional method.

A first aspect of the present disclosure provides a method for determining a motion trajectory of a target, comprising:

obtaining a transmitted signal, a first echo signal, and a second echo signal of a frequency modulated continuous wave radar, where the first echo signal is the transmitted signal reflected by the target and received by a first receiving antenna of the radar, the second echo signal is the transmitted signal reflected by the target and received by a second receiving antenna of the radar;

performing a coherent operation on the transmitted signal and the first echo signal to determine a beat signal between the transmitted signal and the first echo signal;

performing a two-dimensional fast Fourier transform on the beat signal to determine an initial position of the target;

performing a short-time Fourier transform on the beat signal to determine a radial velocity of the target;

calculating a difference frequency signal between the first echo signal and the second echo signal according to a frequency shift of the first echo signal and a frequency shift of the second echo signal;

determining a tangential velocity of the target according to the difference frequency signal;

inputting the initial position, the radial velocity, and the tangential velocity to a Kalman filter, and receiving a motion trajectory of the target output by the Kalman filter.

Optionally, the performing a two-dimensional fast Fourier transform on the beat signal to determine an initial position of the target, includes:

performing a fast-time fast Fourier transform on the beat signal to determine a first frequency shift of the beat signal;

performing a slow-time fast Fourier transform on the beat signal to determine a second frequency shift of the beat signal;

generating a range-velocity map according to the first frequency shift and the second frequency shift; and performing a peak value detection on the range-velocity map, and using a position corresponding to a peak value in the range-velocity map as the initial position of the target.

Optionally, before the using a position corresponding to a peak in the range-velocity map as the initial position of the target, the method further includes:

if the peak is greater than or equal to a preset peak threshold, it is determined that the target exists in the range-velocity map.

Optionally, the performing a short-time Fourier transform on the beat signal to determine a radial velocity of the target, includes:

performing the short-time Fourier transform on the beat signal to determine a third frequency shift of the beat signal; and calculating the radial velocity of the target using the formula $$v_r = \frac{cf_d}{2f_0};$$

where $v_r$ is the radial velocity, c is the speed of light, $f_d$ is the third frequency shift, and $f_0$ is a carrier central frequency.

Optionally, the determining a tangential velocity of the target according to the difference frequency signal, includes:

calculating the tangential velocity of the target using the formula $$\omega = \frac{f_a \lambda_{t_s}}{D};$$

where $\omega$ is the tangential velocity, D is a baseline length between the two receiving antennas, $f_a$ is the difference frequency signal, $\lambda_{t_s}$ is a radar carrier wavelength corresponding to $t=t_s+nT$, and T is a sweep period.

Optionally, after the receiving a motion trajectory of the target output by the Kalman filter, the method further includes:

tracking the target according to the motion trajectory of the target.

A second aspect of the present disclosure provides a device for determining a motion trajectory of a target, including:

an obtaining module, configured to obtain a transmitted signal, a first echo signal, and a second echo signal of a frequency modulated continuous wave radar, where the first echo signal is the transmitted signal reflected by the target and received by a first receiving antenna of the radar, the second echo signal is the transmitted signal reflected by the target and received by the second receiving antenna of the radar;

a beat signal determining module, configured to perform a coherent operation on the transmitted signal and the first echo signal to determine a beat signal between the transmitted signal and the first echo signal;

an initial position determining module, configured to perform a two-dimensional fast Fourier transform on the beat signal to determine an initial position of the target;

a radial velocity determining module, configured to perform a short-time Fourier transform on the beat signal to determine a radial velocity of the target;

a difference frequency signal calculating module, configured to calculate a difference frequency signal between the first echo signal and the second echo signal, according to a frequency shift of the first echo signal and a frequency shift of the second echo signal;

a tangential velocity determining module, configured to determine a tangential velocity of the target according to the difference frequency signal; and a motion trajectory determining module, configured to input the initial position, the radial velocity, and the tangential velocity into a Kalman filter, and receive a motion trajectory of the target output by the Kalman filter.

Optionally, the initial position determining module is specifically configured to perform a fast-time fast Fourier transform on the beat signal, to determine a third frequency shift of the beat signal; perform a slow-time fast Fourier transform on the beat signal, to determine a fourth frequency shift of the beat signal; generate a range-velocity map of the target according to the third frequency shift and the fourth frequency shift; perform a peak value detection on the range-velocity map and extract a peak value in the range-velocity map; and use a position corresponding to the peak value as the initial position of the target.

Optionally, the initial position determining module is further configured to determine that when the peak value is greater than or equal to a preset peak threshold, the target exists in the range-velocity map.

Optionally, the radial velocity determining module is specifically configured to perform a short-time Fourier transform on the beat signal to determine a fifth frequency shift of the beat signal; calculate the radial velocity of the target using the formula $$v_r = \frac{cf_d}{2f_0},$$

where $v_r$ is the radial velocity, c is the speed of light, $f_d$ is the fifth frequency shift, and $f_0$ is a carrier central frequency.

Optionally, the tangential velocity determining module is specifically configured to calculate the tangential velocity of the target by using the formula $$\omega = \frac{f_a \lambda_{t_s}}{D},$$

where $\omega$ is the tangential velocity, D is a baseline length between the two receiving antennas, $f_a$ is the difference frequency signal, $\lambda_{t_s}$ is a radar carrier wavelength corresponding to the time $t=t_s+nT$, and T is a sweep period.

Optionally, the device also includes:

a tracking module, configured to track the target according to the motion trajectory.

A third aspect of the present disclosure provides an electronic device, including:

a memory for storing program instructions; and processor for calling and executing the program instructions in the memory to perform steps of the methods described in the first aspect.

A fourth aspect of the present disclosure provides a storage medium having stored therein a computer program that performs any of the methods described in the first aspect.

The method and device for determining the motion trajectory of the target provided by the present disclosure are determining the beat signal between the transmitted signal and the first echo signal by acquiring the transmitted signal, the first echo signal and the second echo signal of the frequency modulated continuous wave radar, and determining the difference frequency signal between the first echo signal and the second echo signal; subsequently, determining the initial position, the radial velocity, and the tangential velocity of the target according to the beat signal and the difference frequency signal; finally, inputting the initial position, the radial velocity, and the tangential velocity to the Kalman filter, and receiving the motion trajectory of the target output by the Kalman filter. In this way, the target can be accurately detected and tracked, which provides a key technology for a drone monitoring system and realizes monitoring of a motion trajectory of a drone.

BRIEF DESCRIPTION OF THE DRAWINGS

To illustrate the technical solutions in the present disclosure or in prior art clearly, drawings required in the description of the embodiment or prior art are briefly introduced. Obviously, the drawings in the following description are some embodiments of the present disclosure, and those skilled in this area can obtain other drawings based on these drawings without any creative labor.

DETAILED DESCRIPTION

The technical solutions in the embodiments of the present disclosure are clearly and completely described in the following with reference to the drawings in the embodiments of the present disclosure. It is obvious that the described embodiments are only part of the embodiments of the present disclosure, but not all embodiments. All other embodiments obtained by a person of ordinary skill in the art based on the embodiments of the present disclosure without creative efforts are within the scope of the present disclosure.

In an existing technology, the targets are usually monitored and tracked in a target area using conventional radar. However, since a small drone has small radar cross section, low altitude and low velocity, it is difficult to detect and track such target. In addition, some drones have complex and variable motion paths, which are difficult to be described with feasible mathematical models, increasing the difficulty of tracking. Therefore, the traditional method of determining a motion trajectory of a target using conventional radar may not be able to monitor a motion trajectory of a drone.

Considering the problems above, the present disclosure provides a method for determining a motion trajectory of a target, including acquiring a transmitted signal, a first echo signal, and a second echo signal of a frequency modulated continuous wave radar, to determine a beat signal between the transmitted signal and the first echo signal, and determine a difference frequency signal between the first echo signal and the second echo signal; then determining an initial position, a radial velocity and a tangential velocity of the target according to the beat signal and the difference frequency signal; finally inputting the initial position, the radial velocity, and the tangential velocity to a Kalman filter, and receiving a motion trajectory of the target output by the Kalman filter. In this way, the target can be detected and tracked accurately, which provides a key technology for a drone monitoring system and realizes monitoring of a motion trajectory of a drone.

Figure 1:
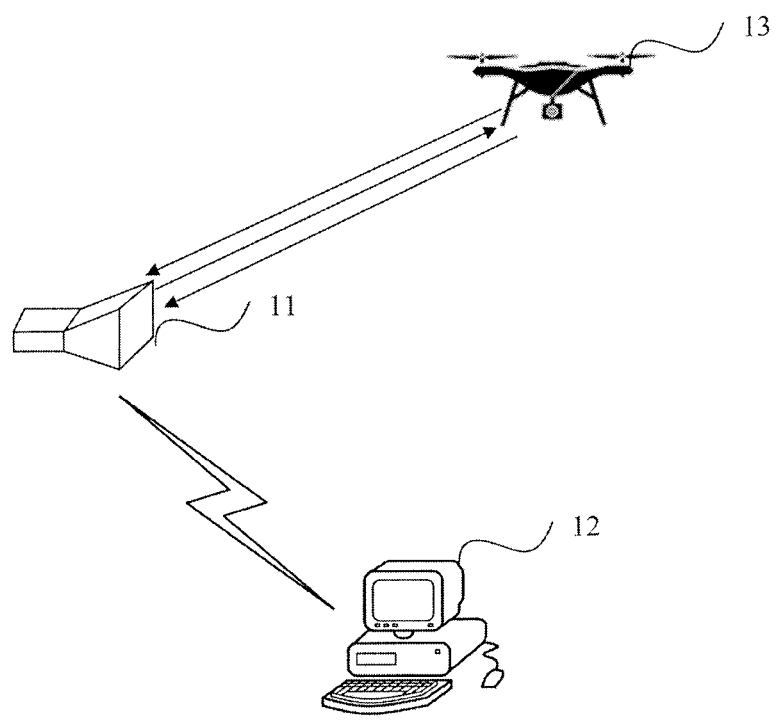
FIG. 1 is a schematic diagram of an application scenario of a method for determining a motion trajectory of a target provided by the present disclosure.

The following embodiments take a drone as a target to illustrate and explain the method for determining the motion trajectory of the target provided by the embodiments of the present application. FIG. 1 is a schematic diagram of a application scenario of a method for determining a motion trajectory of a target provided by the present disclosure. In this scenario, a transmitting antenna of a frequency modulated continuous wave radar 11 transmits a signal, and two receiving antennas of the frequency modulated continuous wave radar 11 receive a first echo signal and a second echo signal respectively after the transmitted signal is reflected by a drone 13. Then, a terminal 12 obtains the above-mentioned transmitted signal, the first echo signal and the second echo signal from the frequency modulated continuous wave radar 11, and a motion trajectory of the target drone 13 is determined by using the method for determining the motion trajectory of the target provided by the present disclosure. Where the terminal 12 can be, for example, computers, mobile phones, tablet computers, etc.

It can be understood that the methods provided by the embodiments of the present application can be used not only to determine a motion trajectory of a drone, but also to determine a motion trajectory of any object.

The following is a detailed description of the technical solutions of the embodiments of the present application by taking a terminal that integrates or installs relevant execution codes as an example. The following specific embodiments may be combined with each other, and the same or similar concepts or processes may not be repeatedly described in some embodiments.

Figure 2:
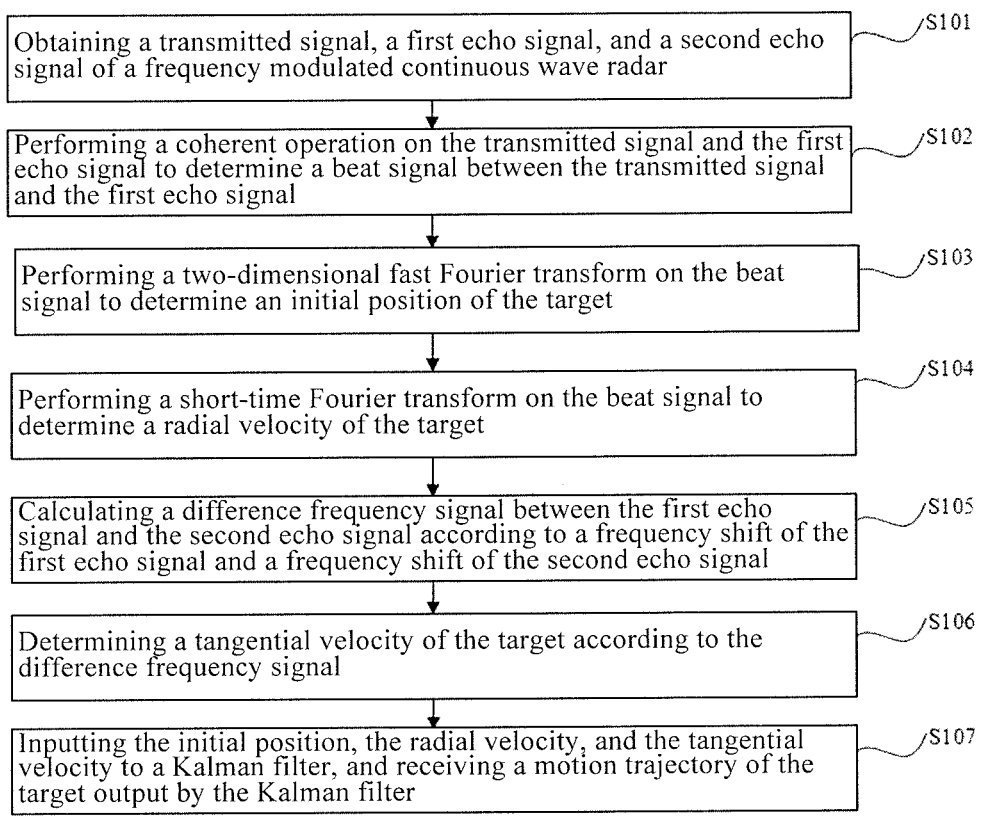
FIG. 2 is a schematic flowchart of a method for determining a motion trajectory of a target provided by the present disclosure.

FIG. 2 is a schematic flowchart of a method for determining a motion trajectory of a target provided by the present disclosure. This embodiment relates to a specific process of how the terminal processes the signal of the frequency modulated continuous wave radar to determine the motion trajectory of the target. As shown in FIG. 2, the method includes:

S101, obtaining a transmitted signal, a first echo signal, and a second echo signal of a frequency modulated continuous wave radar.

The frequency modulated continuous wave radar can be a continuous wave radar whose transmission frequency is modulated by a specific signal.

Where the first echo signal is the transmitted signal reflected by the target and received by a first receiving antenna of the radar, and the second echo signal is the transmitted signal reflected by the target and received by a second receiving antenna of the radar.

In this step, the transmitted signal may specifically be a chirp signal. The transmitting antenna of the frequency modulated continuous wave radar transmits a chirp signal, which is reflected by the target to form the first echo signal and the second echo signal, and is received by the first receiving antenna and the second receiving antenna of the radar.

Specifically, when the carrier central frequency of the frequency modulated continuous wave radar is $f_0$, the bandwidth is B, and the sweep period is T, the transmitted signal can be expressed by formula (1) as follows:

$$s_T(t) = \exp\left\{-j2\pi\left[f_0 t_s + \frac{K}{2} t_s^2\right]\right\} \quad (1)$$

Where $t_s = t - nT$ is the time from the n th sweep, $$K = \frac{B}{T}$$

is a frequency modulation slope, $f_0$ is a carrier central frequency, B is the bandwidth, T is the sweep period, and j is an imaginary unit.

Figure 3:
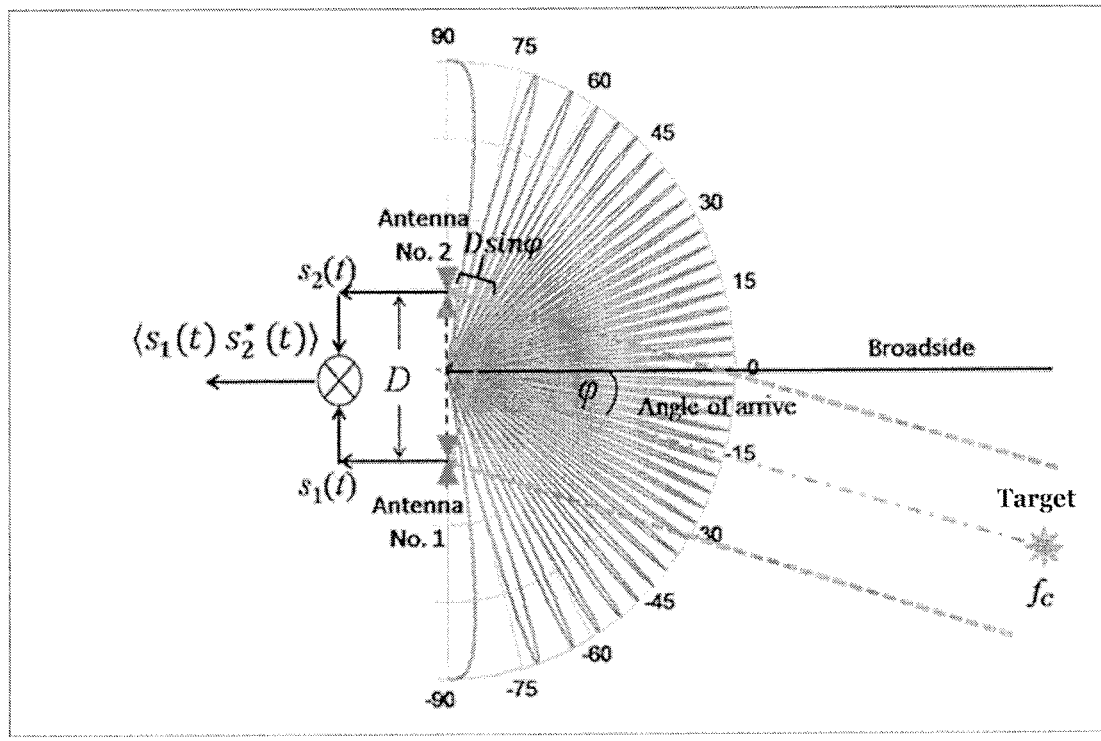
FIG. 3 is a schematic diagram of an echo signal of a frequency modulated continuous wave interferometric radar provided by the present disclosure.

FIG. 3 is a schematic diagram of an echo signal of a frequency modulated continuous wave interferometric radar provided by the present disclosure. As shown in FIG. 3, for a single target, the first echo signal and the second echo signal can be represented as the transmitted signal after a delay τ, a distance between the first receiving antenna and the second receiving antenna is let as D, the first echo signal can be specifically expressed as formula (2), and the second echo signal can be specifically expressed as formula (3):

$$s_{R1}(t) = \exp\left\{-j2\pi\left[f_0(t_s - \tau) + \frac{K}{2}(t_s - \tau)^2\right]\right\} \quad (2)$$

$$s_{R2}(t) = \exp\left\{-j2\pi\left[f_0(t_s - \tau - \tau_0) + \frac{K}{2}(t_s - \tau - \tau_0)^2\right]\right\} \quad (3)$$

Where the delay $$= \frac{2R_0}{c} = \frac{2R - v_r t}{c}$$

is related to a range R of the target relative to the radar and the radial velocity $v_r$, and the delay $$\tau_0 = \frac{D\sin\varphi}{c},$$

φ is the angle of arrival of the radar echo signal.

S102, performing a coherent operation on the transmitted signal and the first echo signal to determine a beat signal between the transmitted signal and the first echo signal.

In this step, the coherent operation performed on the received first echo signal and the transmitted signal is that the first echo signal is multiplied by the transmitted signal according to the principle of the frequency modulated continuous wave radar, to obtain the beat signal as shown in formula (4) as follows:

$$s_{B_1}(t) = s_T(t)s_R^*(t) \approx \exp\left(-j4\pi\left[\frac{K(R_0 + v_r nT)}{c}t_s + \frac{v_r}{\lambda}nT + \frac{R_0}{\lambda}\right]\right) \quad (4)$$

Where λ is a carrier wavelength.

S103, performing a two-dimensional fast Fourier transform on the beat signal to determine an initial position of the target;

In this step, a fast-time fast Fourier transform and a slow-time fast Fourier transform can be respectively performed on the beat signal obtained in formula (4), and then a range-velocity map is drawn according to frequency shift calculated by the two fast Fourier transforms, and the initial position of the target is determined from the range-velocity map.

S104, performing a short-time Fourier transform on the beat signal to determine a radial velocity of the target.

In this step, the received signal from the frequency modulated continuous wave radar is downsampled so that the sampling period $t_s$ is identical to the sweep period T. Therefore, the short-time Fourier transform can be performed on the beat signal determined by formula (4), and the peak value can be extracted as a third frequency shift, which is caused by the moving of the target.

Subsequently, the radial velocity of the target can be calculated by formula (5), and the formula (5) is as follows:

$$v_r = \frac{cf_d}{2f_0} \quad (5)$$

Where $v_r$ is the radial velocity, c is the speed of light, $f_d$ is the third frequency shift, and $f_0$ is a carrier central frequency.

S105, calculating a difference frequency signal between the first echo signal and the second echo signal according to a frequency shift of the first echo signal and a frequency shift of the second echo signal.

In this step, since the spectrogram of the interferometric signal has a strong low-frequency component, which will interfere with the signal generated by the target, the difference frequency signal between the two echo signals can be used to replace the extraction of the peak value in the spectrogram of the interferometric signal. That is, the difference frequency signal between the first echo signal and the second echo signal is calculated by formula (6) as follows:

$$f_a = f_{d1} - f_{d2} \quad (6)$$

where $f_a$ is the difference frequency signal, $f_{d1}$ is the frequency shift of the first echo signal, and $f_{d2}$ is the frequency shift of the second echo signal.

S106, determining a tangential velocity of the target according to the difference frequency signal.

In this step, on the basis of determining the difference frequency signal by formula (6), the tangential velocity of the target can be calculated by using formula (7) as follows:

$$\omega = \frac{f_a \lambda_{t_s}}{D} \quad (7)$$

Where φ is the tangential velocity, D is a baseline length between the two receiving antennas, $f_a$ is the difference frequency signal, $\lambda_{t_s}$ is a radar carrier wavelength corresponding to $t=t_s+nT$, and T is the sweep period.

S107, inputting the initial position, the radial velocity, and the tangential velocity to a Kalman filter, and receiving a motion trajectory of the target output by the Kalman filter.

In this step, based on the initial position of the target, the radial velocity $v_r$ and the tangential angular velocity ω, a trajectory of the target can be obtained by the Kalman filter. A method of estimating the trajectory of the target using the Kalman filter is as follows:

Let the state of the target at time k be as described in formula (8):

$$x_k = (\varphi, R, \omega, v_r)^T \quad (8)$$

The state can be estimated as in equation (9):

$$\hat{x}_k = (\hat{\varphi}, \hat{R}, \hat{\omega}, \hat{v}_r)^T \quad (9)$$

Since the system has no controlled input, the state at time k can be expressed as in equation (10):

$$x = Fx_{k-1} + v \quad (10)$$

Where v is a process noise with a covariance matrix Q, state transition matrix $$F = \begin{bmatrix} 1 & 0 & t & 0 \\ 0 & 1 & 0 & t \\ 0 & 0 & 1 & 0 \\ 0 & 0 & 0 & 1 \end{bmatrix}.$$

In a continuous white noise acceleration process, the covariance matrix Q needs to satisfy formula (11), and the formula (11) is as follows:

$$Q = \begin{bmatrix} \frac{1}{3}t^3 & 0 & \frac{1}{2}t^2 & 0 \\ 0 & \frac{1}{3}t^3 & 0 & \frac{1}{2}t^2 \\ \frac{1}{2}t^2 & 0 & t & 0 \\ 0 & \frac{1}{2}t^2 & 0 & t \end{bmatrix} q \quad (11)$$

Where t is a sampling interval and q is determined by a motion characteristic of the target. A predicted state based on the previous state is calculated in formula (12):

$$\hat{x}_{k|k-1} = F\hat{x}_{k-1} \quad (12)$$

Whose covariance is as in formula (13):

$$P_{k|k-1} = FP_{k-1}F^T + Q \quad (13)$$

Where $P_{k-1}$ is an estimation error.

The state is updated by a measurement, whose observation matrix H=

$$H = \begin{bmatrix} 0 & 0 & 1 & 0 \\ 0 & 0 & 0 & 1 \end{bmatrix}.$$

The optimal Kalman gain is as shown in formula (14):

$$K_k = P_{k|k-1} H^T (H P_{k|k-1} H^T + R)^{-1} \tag{14}$$

Where $$R = \begin{bmatrix} 8r_r/D^2 & 2r_r/D \\ 2r_r/D & r_r \end{bmatrix}$$

is a covariance matrix of an observation noise, $r_r$ is a variance of an observation noise of the radial velocity.

The updated state estimate is determined by formula (15):

$$\hat{x}_k = \hat{x}_{k|k+1} - K_k(Z_k - H\hat{x}_{k|k-1}) \tag{15}$$

Where $Z_k$ $(\omega_k, v_{rk})^T$ is a measurement value at time k.

At last, a covariance estimate is updated according to formula (16):

$$P_k = (I - K_k H) \hat{P}_{k|k-1} \tag{16}$$

The motion trajectory of the target can be obtained by repeating the processes above.

The method and device for determining the motion trajectory of the target provided by the embodiment are acquiring the transmitted signal, the first echo signal and the second echo signal of the frequency modulated continuous wave radar to determine the beat signal between the transmitted signal and the first echo signal, and determine the difference frequency signal between the first echo signal and the second echo signal; subsequently, determining the initial position, the radial velocity, and the tangential velocity of the target according to the beat signal and the difference frequency signal; finally, inputting the initial position, the radial velocity, and the tangential velocity to the Kalman filter, and receiving the motion trajectory of the target output by the Kalman filter. In this way, the target can be accurately detected and tracked, which provides a key technology for a drone monitoring system and realizes monitoring of a motion trajectory of a drone.

Figure 4:
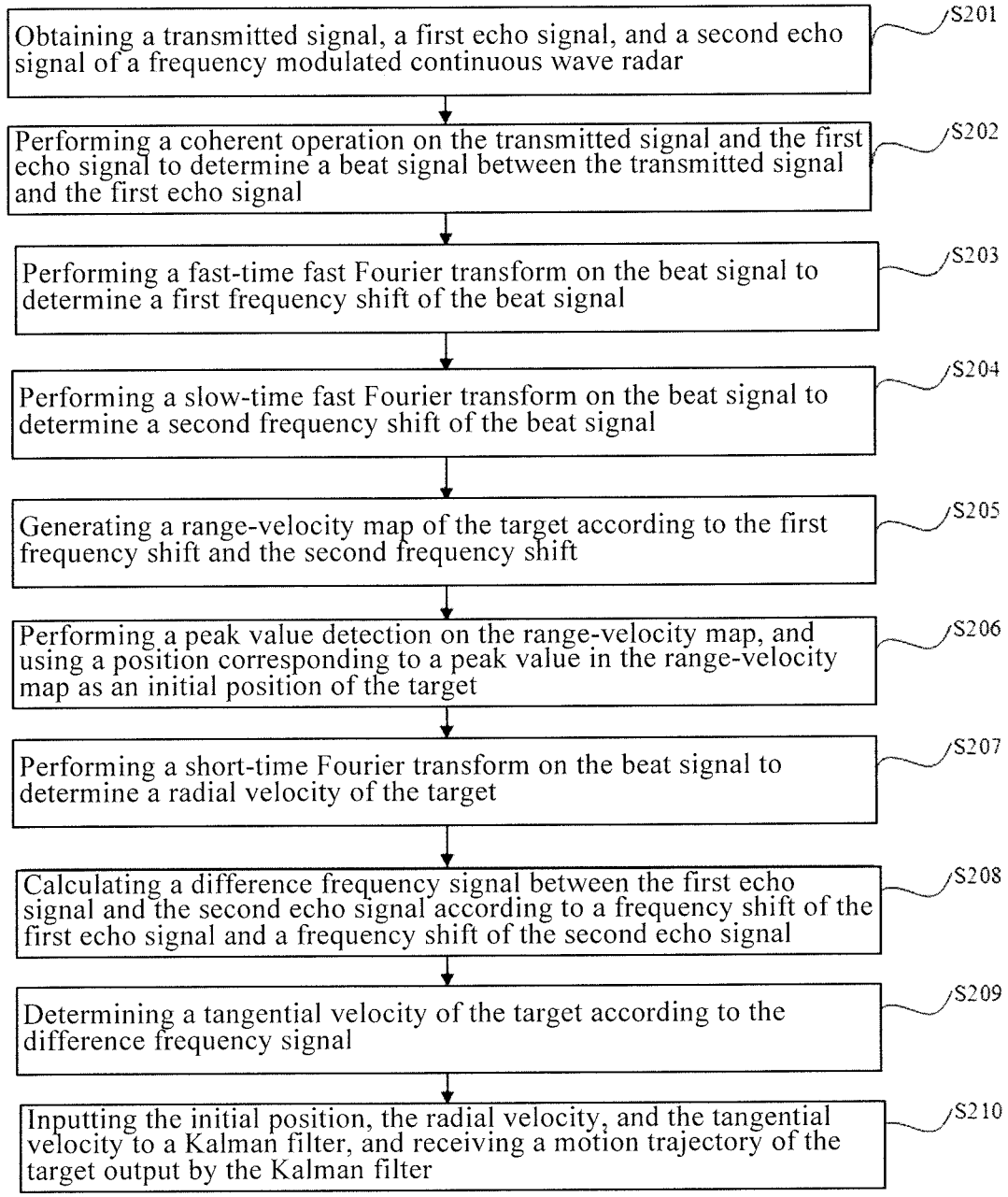
FIG. 4 is a schematic flowchart of another method for determining the motion trajectory of the target provided by the present disclosure.

The following is a description of performing a two-dimensional fast Fourier transform on the beat signal to determine the initial position of the target. FIG. 4 is a schematic flowchart of another method for determining a motion trajectory of a target provided by the present disclosure. This embodiment relates to a specific process of how a terminal performs a two-dimensional fast Fourier transform on the beat signal to determine the initial position of the target. On the basis of FIG. 2, and as shown in FIG. 4, the method includes:

S201, obtaining a transmitted signal, a first echo signal, and a second echo signal of a frequency modulated continuous wave radar.

S202, performing a coherent operation on the transmitted signal and the first echo signal to determine a beat signal between the transmitted signal and the first echo signal.

The technical terms, technical effects, technical features, and optional embodiments of the steps S201-S202 can be understood by referring to the steps S101-S102 shown in FIG. 2. The repeated steps are not repeated here.

S203, performing a fast-time fast Fourier transform on the beat signal to determine a first frequency shift of the beat signal.

Figure 5:
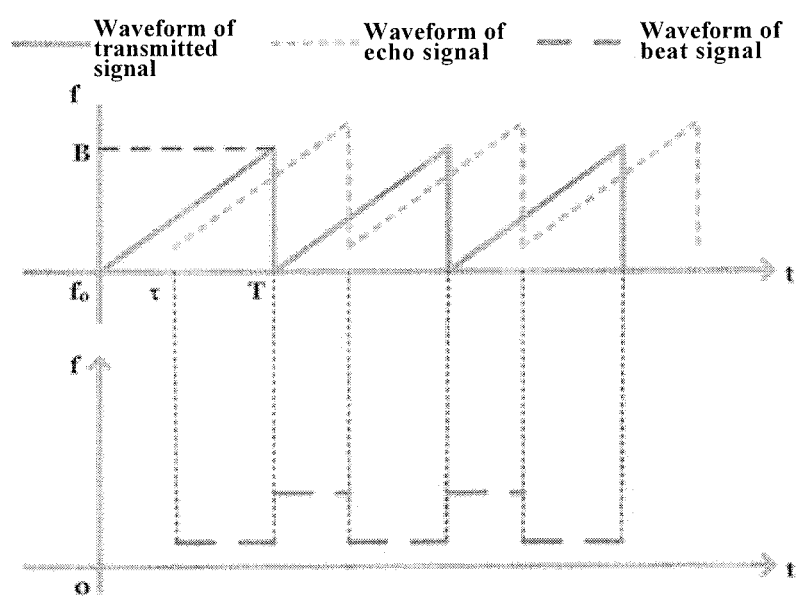
FIG. 5 is a time domain waveform diagram of a transmitted signal, an echo signal, and a beat signal provided by the present disclosure.

FIG. 5 is a time domain waveform diagram of a transmitted signal, an echo signal, and a beat signal provided by the present disclosure. It can be known from the formula (4) above and FIG. 5 that in the Nth pulse repetition period, by performing a fast-time Fourier transform on the beat signal, the first frequency shift of the beat signal can be determined as $$\frac{2K(R_0 + v_r nT)}{c}.$$

S204, performing a slow-time fast Fourier transform on the beat signal to determine a second frequency shift of the beat signal.

In this step, it can be known from the formula (4) above and FIG. 5 that in the Nth pulse repetition period, by performing a slow-time fast Fourier transform on the beat signal, the second frequency shift of the beat signal can be determined as $$\frac{2v_r}{\lambda}.$$

S205, generating a range-velocity map of the target according to the first frequency shift and the second frequency shift.

Normally, within the same pulse repetition period, the target is considered to be in the same range gate, and a range between the target and the radar can be as shown in formula (17):

$$R(t) = R(nT) = R_0 + v_r nT \tag{17}$$

Where R is the range between the target and the radar.
According to the first frequency shift $$\frac{2K(R_0 + v_r nT)}{c},$$

the second frequency shift $$\frac{2v_r}{\lambda}$$

and the formula (17), the relationship between range and velocity can be determined, and then the range-velocity map of the target is generated.

S206, performing a peak value detection on the range-velocity map, and using a position corresponding to a peak value in the range-velocity map as an initial position of the target.

In this step, the peak value detection is performed on the range-velocity map. If the peak value in the range-velocity map is greater than or equal to a preset peak threshold, then the target is determined to exist in the range-velocity map, and the position corresponding to the peak value is regarded as the initial position of the target. If the peak value in the range-velocity map is less than the preset peak threshold, then the target is not detected by the frequency modulated continuous wave radar.

S207, performing a short-time Fourier transform on the beat signal to determine a radial velocity of the target.

S208, calculating a difference frequency signal between the first echo signal and the second echo signal according to a frequency shift of the first echo signal and a frequency shift of the second echo signal.

S209, determining a tangential velocity of the target according to the difference frequency signal.

S210, inputting the initial position, the radial velocity, and the tangential velocity to a Kalman filter, and receiving a motion trajectory of the target output by the Kalman filter.

The technical terms, technical effects, technical features, and optional embodiments of the steps S207-S210 can be understood by referring to the steps S104-S107 shown in FIG. 2. The repeated steps are not repeated here.

The method and device for determining the motion trajectory of the target provided by the embodiment are acquiring the transmitted signal, the first echo signal and the second echo signal of the frequency modulated continuous wave radar, to determine the beat signal between the transmitted signal and the first echo signal, and determine the difference frequency signal between the first echo signal and the second echo signal; subsequently, determining the initial position, the radial velocity, and the tangential velocity of the target according to the beat signal and the difference frequency signal; finally, inputting the initial position, the radial velocity, and the tangential velocity to the Kalman filter, and receiving the motion trajectory of the target output by the Kalman filter. In this way, the target can be accurately detected and tracked, which provides a key technology for a drone monitoring system and realizes monitoring of a motion trajectory of a drone and realizes monitoring of a motion trajectory of a drone.

The tracking of the drone is usually based on an initial position and a two-dimensional velocity of the drone. The aforementioned embodiment has explained the process of determining the motion trajectory of the drone. Furthermore, the initial position and the two-dimensional velocity can also be determined by the motion trajectory of the drone, thereby realizing the tracking of the drone. The following describes the tracking of the target based on the motion trajectory.

Figure 6:
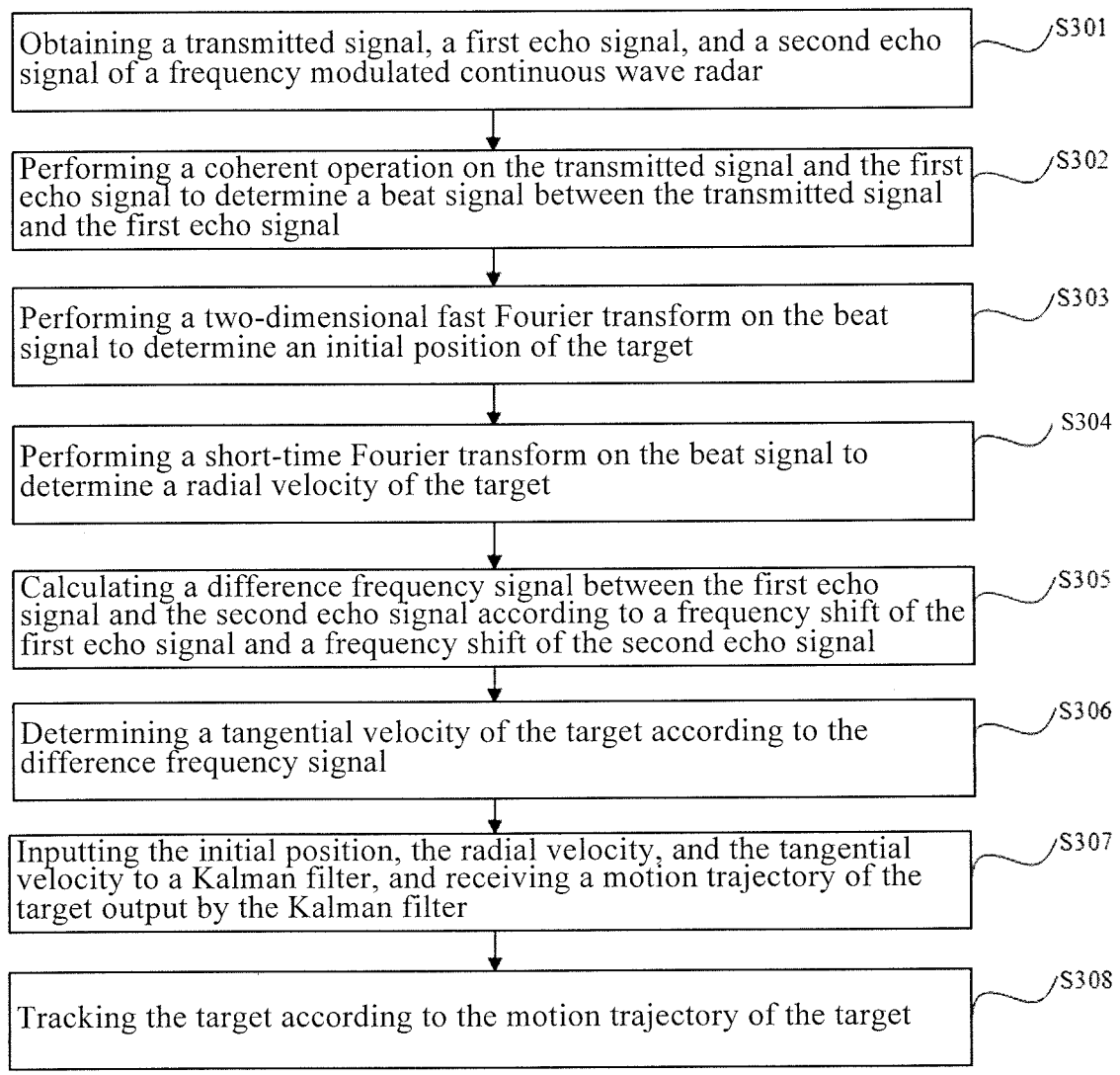
FIG. 6 is a schematic flowchart of yet another method for determining the motion trajectory of the target provided by the present disclosure.

FIG. 6 is a schematic flowchart of yet another method for determining the motion trajectory of the target provided by the present disclosure. This embodiment relates to a specific process of how a terminal tracks the target after determining the motion trajectory of the target. Based on the aforementioned embodiment, and as shown in FIG. 6, the method further includes:

S308, tracking the target according to the motion trajectory of the target.

Figure 7:
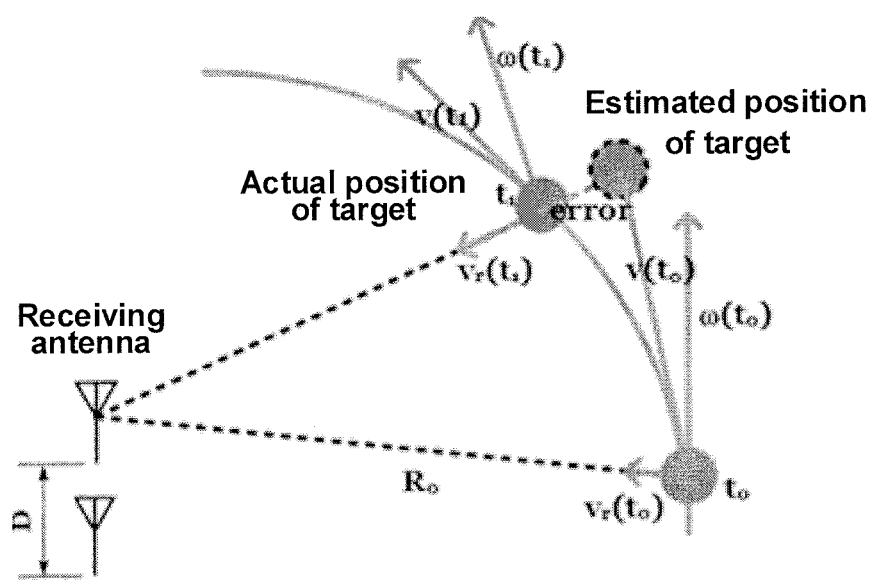
FIG. 7 is a schematic diagram of a drone tracking principle provided by the present disclosure.

FIG. 7 is a schematic diagram of a drone tracking principle provided by the present disclosure. As shown in FIG. 7, the target moves along a curve motion trajectory whose initial position is $R_0$ at time t=0. When the radar has a very narrow wave beam, the target can be considered to be in the direction of the light of sight (LoS) of the radar. The linear velocity v of the target describes its rate of change in position, which can be decomposed into a radial velocity $v_r$ along the LoS and a tangential velocity $v_t$ perpendicular to the LoS, where $v_t$ corresponds to an angular velocity $\omega$. When the time interval for measurement is short enough, an instantaneous velocity of the target can replace an average velocity in one measurement period with a certain measurement error, thereby estimating the trajectory of the target. Therefore, combined with the initial position of the target, a position of the target at the next time can be predicted, so as to achieve the tracking of the target. When the target's motion trajectory is out of a preset range or is about to exceed the preset range, an alarm can be issued for reminding.

The method and device for determining the motion trajectory of the target provided by the embodiment are determining a current position of the target by a current motion trajectory of the target, performing a motion trajectory prediction of the target using two-dimensional velocity of the target, and finally, tracking the target based on the current motion trajectory of the target, the current position, and the predicted motion trajectory, to realize a real-time monitoring of a complex motion trajectory of the target.

One of ordinary skill in the art can understand: all or part of the steps of implementing the above embodiment may be performed by hardware associated with program instructions. The foregoing program may be stored in a computer readable storage medium, and when executed, the steps of the above method embodiment are performed. The aforementioned storage medium may include various media that can store program codes, such as, read-only memory (ROM), random access memory (RAM), hard disk, CD, etc.

Figure 8:
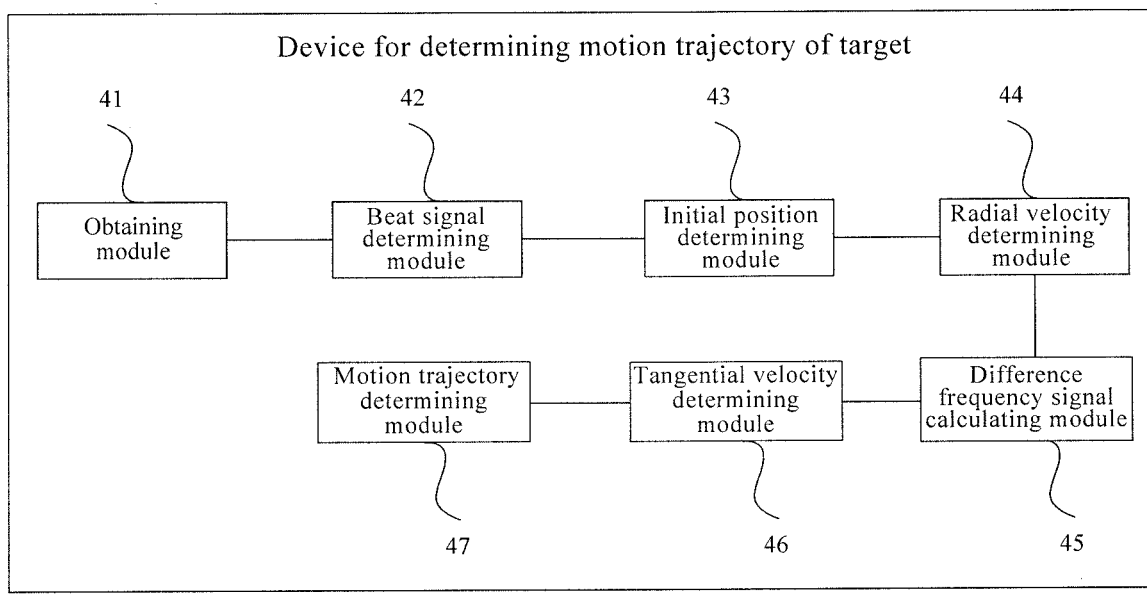
FIG. 8 is a schematic diagram of a structure of a device for determining a motion trajectory of a target provided by the present disclosure.

FIG. 8 is a schematic diagram of a structure of a device for determining a motion trajectory of a target provided by the present disclosure. The device for determining the motion trajectory of the target may be implemented by software, hardware or a combination of both, and may be the aforementioned terminal.

As shown in FIG. 8, the device 40 for determining the motion trajectory of the target includes: an obtaining module 41, a beat signal determining module 42, an initial position determining module 43, a radial velocity determining module 44, a difference frequency signal calculating module 45, a tangential velocity determining module 46 and a motion trajectory determining module 47.

The obtaining module 41 is configured to obtain a transmitted signal, a first echo signal, and a second echo signal of a frequency modulated continuous wave radar, where the first echo signal is the transmitted signal reflected by the target and received by a first receiving antenna of the radar, the second echo signal is the transmitted signal reflected by the target and received by a second receiving antenna of the radar.

The beat signal determining module 42 is configured to perform a coherent operation on the transmitted signal and the first echo signal to determine a beat signal between the transmitted signal and the first echo signal.

The initial position determining module 43 is configured to perform a two-dimensional fast Fourier transform on the beat signal to determine an initial position of the target;

where the initial position determining module 43 is specifically configured to perform a fast-time fast Fourier transform on the beat signal to determine a third frequency shift of the beat signal; perform a slow-time fast Fourier transform on the beat signal to determine a fourth frequency shift of the beat signal; generating a range-velocity map of the target according to the third frequency shift and the fourth frequency shift; performing a peak value detection on the range-velocity map and extracting a peak value in the range-velocity map; using a position corresponding to the peak value as the initial position of the target.

The initial position determining module 43 is further configured to determine that the target exists in the range-velocity map when the peak value is greater than or equal to a preset peak threshold.

The radial velocity determining module 44 is configured to perform a short-time Fourier transform on the beat signal to determine a radial velocity of the target.

The radial velocity determining module 44 is specifically configured to perform a short-time Fourier transform on the beat signal to determine a fifth frequency shift of the beat signal; calculate the radial velocity of the target using the formula $$v_r = \frac{cf_d}{2f_0},$$

where $v_r$ is the radial velocity, c is the speed of light, $f_d$ is the fifth frequency shift, and $f_0$ is a carrier central frequency.

The difference frequency signal calculating module 45 is configured to calculate a difference frequency signal between the first echo signal and the second echo signal, according to a frequency shift of the first echo signal and a frequency shift of the second echo signal.

The tangential velocity determining module 46 is configured to determine a tangential velocity of the target according to the difference frequency signal.

The tangential velocity determining module 46 is specifically configured to calculate the tangential velocity of the target using the formula $$\omega = \frac{f_a \lambda_{t_s}}{D},$$

where $\omega$ is the tangential velocity, D is a baseline length between the two receiving antennas, $f_a$ is the difference frequency signal, $\lambda_{t_s}$ is a radar carrier wavelength corresponding to the time $t = t_s + nT$, and T is a sweep period.

The motion trajectory determining module 47 is configured to input the initial position, the radial velocity, and the tangential velocity into a Kalman filter, and receive a motion trajectory of the target output by the Kalman filter.

The device for determining the motion trajectory of the target provided by the present disclosure can perform actions of the server in the above method embodiment the, and they have similar implementation principle and technical effects, and thus will not be repeated here.

Figure 9:
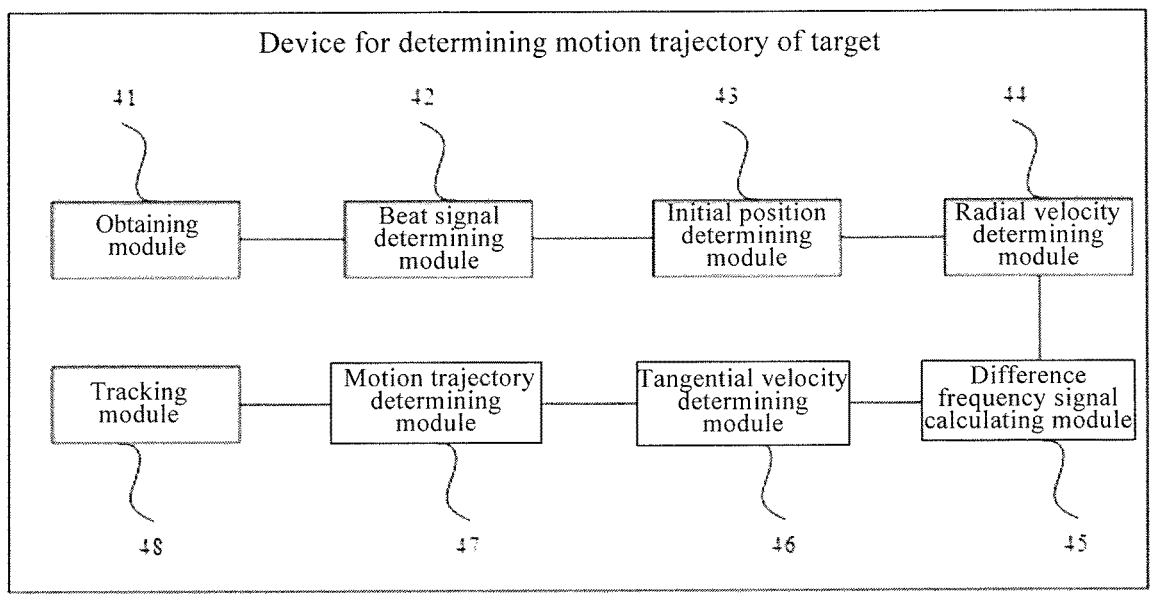
FIG. 9 is a schematic diagram of a structure of another device for determining the motion trajectory of the target provided by the present disclosure.

FIG. 9 is a schematic diagram of a structure of another device for determining the motion trajectory of the target provided by the present disclosure. This device may be implemented by software, hardware or a combination of both, and may be the aforementioned terminal.

On the basis of FIG. 8, and as shown in FIG. 9, the device 40 for determining the motion trajectory of the target further includes:

a tracking module 48, configured to track the target according to the motion trajectory.

The device for determining the motion trajectory of the target provided by the present disclosure can perform the embodiment of the method shown in FIG. 1-3 and they have similar implementation principle and technical effects, and thus will not be repeated here.

Figure 10:
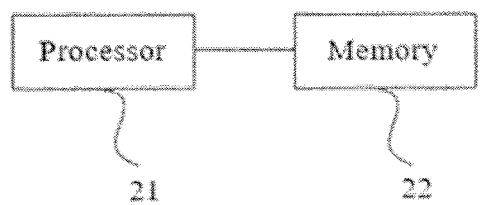
FIG. 10 is a schematic diagram of a structure of yet another device for determining the motion trajectory of the target provided by the present disclosure.

FIG. 10 is a schematic diagram of a structure of yet another device for determining the motion trajectory of the target provided by the present disclosure. As shown in FIG. 10, the device for determining the motion trajectory of the target may include at least one processor 21 and a memory 22. FIG. 10 shows an electronic device taking a processor as an example.

The memory 22 is for storing a program. Specifically, the program can include program codes, the program codes including computer operating instructions.

The memory 22 may include a high speed RAM memory, and may also include a non-volatile memory, such as at least one hard disk memory.

The processor 21 is for executing computer executable instructions stored in the memory 22 to perform the procedure of the first aspect. Where the processor 21 may be a central processing unit (CPU), or an application specific integrated circuit (ASIC), or one or more integrated circuits configured to implement the embodiments of the present patent application.

Optionally, in a specific implementation, if a communication interface, the memory 22, and the processor 21 are implemented independently, then the communication interface, the memory 22, and the processor 21 may be connected to each other through a bus and communicate with each other. The bus may be an industry standard architecture (ISA) bus, a peripheral component interconnection (PCI) bus, or an extended industry standard architecture (EISA) bus, and the like. The bus can be divided into an address bus, a data bus, a control bus, etc., but does not mean that there is only one bus or one type of bus.

Optionally, in a specific implementation, if the communication interface, the memory 22, and the processor 21 are integrated on one chip, then the communication interface, the memory 22, and the processor 21 can complete communication through an internal interface.

The present disclosure provides a computer readable storage medium, which may include various media that can store program codes which can store program code, such as, flash disk, portable hard disk, read-only memory (ROM), random access memory (RAM), hard disk, CD, etc. Specifically, the computer readable storage medium stores program instructions, and the program instructions are to implement in the methods in the above embodiments.

Finally, it should be noted that, the above embodiments are only an illustration of the technical solutions of the present disclosure, but not intended to be a limitation. Although the present disclosure has been described in detail with reference to the foregoing embodiments, those technicals should understand that the technical solutions described in the foregoing embodiments may be modified, or some or all of the technical features may be equivalently replaced; but the modifications or substitutions do not deviate from the technical solutions of the embodiments of the present disclosure.

What is claimed is:

1. A method for determining a motion trajectory of a target, comprising:
   obtaining a transmitted signal, a first echo signal, and a second echo signal of a frequency modulated continuous wave radar, wherein the first echo signal is the transmitted signal reflected by the target and received by a first receiving antenna of the radar, the second echo signal is the transmitted signal reflected by the target and received by a second receiving antenna of the radar;
   performing a coherent operation on the transmitted signal and the first echo signal to determine a beat signal between the transmitted signal and the first echo signal;
   performing a two-dimensional fast Fourier transform on the beat signal to determine an initial position of the target;
   performing a short-time Fourier transform on the beat signal to determine a radial velocity of the target;
   calculating a difference frequency signal between the first echo signal and the second echo signal according to a frequency shift of the first echo signal and a frequency shift of the second echo signal;

determining a tangential velocity of the target according to the difference frequency signal; and inputting the initial position, the radial velocity, and the tangential velocity to a Kalman filter, and receiving a motion trajectory of the target output by the Kalman filter;

wherein the performing a two-dimensional fast Fourier transform on the beat signal to determine an initial position of the target comprises:

performing a fast-time fast Fourier transform on the beat signal to determine a first frequency shift of the beat signal;

performing a slow-time fast Fourier transform on the beat signal to determine a second frequency shift of the beat signal;

generating a range-velocity map of the target according to the first frequency shift and the second frequency shift; and performing a peak value detection on the range-velocity map, and using a position corresponding to a peak value in the range-velocity map as the initial position of the target.

2. The method according to claim 1, wherein before the using a position corresponding to a peak value in the range-velocity map as the initial position of the target, the method further comprises:

when the peak value is greater than or equal to a preset peak threshold, it is determined that the target exists in the range-velocity map.

3. The method according to claim 1, wherein the performing a short-time Fourier transform on the beat signal to determine a radial velocity of the target comprises:

performing a short-time Fourier transform on the beat signal to determine a third frequency shift of the beat signal; and calculating the radial velocity of the target using the formula $$v_r = \frac{cf_d}{2f_0};$$

where $v_r$ is the radial velocity, c is the speed of light, $f_d$ is the third frequency shift, and $f_0$ is a carrier central frequency.

4. The method according to claim 1, wherein the determining a tangential velocity of the target according to the difference frequency signal comprises:

calculating the tangential velocity of the target using the formula $$\omega = \frac{f_a \lambda_{t_s}}{D};$$

where $\omega$ is the tangential velocity, D is a baseline length between the two receiving antennas, $f_a$ the difference frequency signal, $\lambda_{t_s}$ is a radar carrier wavelength corresponding to the time $t=t_s+nT$, and T is a sweep period.

5. The method according to claim 1, wherein after the receiving a motion trajectory of the target output by the Kalman filter, the method further comprises:

tracking the target according to the motion trajectory of the target.

6. A device for determining a motion trajectory of a target, comprising:

a memory for storing program instructions; and at least one processor for calling and executing the program instructions in the memory to:

obtain a transmitted signal, a first echo signal, and a second echo signal of a frequency modulated continuous wave radar, wherein the first echo signal is the transmitted signal reflected by the target and received by a first receiving antenna of the radar, the second echo signal is the transmitted signal reflected by the target and received by a second receiving antenna of the radar;

perform a coherent operation on the transmitted signal and the first echo signal to determine a beat signal between the transmitted signal and the first echo signal;

perform a two-dimensional fast Fourier transform on the beat signal to determine an initial position of the target;

perform a short-time Fourier transform on the beat signal to determine a radial velocity of the target;

calculate a difference frequency signal between the first echo signal and the second echo signal, according to a frequency shift of the first echo signal and a frequency shift of the second echo signal;

determine a tangential velocity of the target according to the difference frequency signal; and input the initial position, the radial velocity, and the tangential velocity into a Kalman filter, and receive a motion trajectory of the target output by the Kalman filter;

wherein the at least one processor is further configured to perform a fast-time fast Fourier transform on the beat signal, to determine a third frequency shift of the beat signal;

perform a slow-time fast Fourier transform on the beat signal, to determine a fourth frequency shift of the beat signal; generate a range-velocity map of the target according to the third frequency shift and the fourth frequency shift; perform a peak value detection on the range-velocity map and extract a peak value in the range-velocity map; and use a position corresponding to the peak value as the initial position of the target.

7. The device according to claim 6, wherein the at least one processor is further configured to determine that when the peak value is greater than or equal to a preset peak threshold, the target exists in the range-velocity map.

8. The device according to claim 6, wherein the at least one processor is further configured to perform a short-time Fourier transform on the beat signal to determine a fifth frequency shift of the beat signal; calculate the radial velocity of the target using the formula $$v_r = \frac{cf_d}{2f_0},$$

where $v_r$ is the radial velocity, c is the speed of light, $f_d$ is the fifth frequency shift, and $f_0$ is a carrier central frequency.

9. The device according to claim 6, wherein the at least one processor is further configured to calculate the tangential velocity of the target by using the formula $$\omega = \frac{f_a \lambda_{t_s}}{D},$$

where ω is the tangential velocity, D is a baseline length between the two receiving antennas, $f_a$ is the difference frequency signal, $\lambda_{t_s}$ is a radar carrier wavelength corresponding to the time $t=t_s+nT$, and T is a sweep period.

10. The device according to claim 6, wherein the at least one processor is further configured to track the target according to the motion trajectory.

* * * * *